United States Patent [19]

Tsukamura et al.

[11] Patent Number: 5,157,642
[45] Date of Patent: Oct. 20, 1992

[54] OPTICAL DISC RECORDING/REPRODUCTION APPARATUS WITH IMPROVED TRACK SEEKING

[75] Inventors: Yoshihiro Tsukamura; Naoya Eguchi, both of Kanagawa; Kimihiro Saitou; Shingeaki Wachi, both of Tokyo, all of Japan

[73] Assignee: Sony Corporation, Tokyo, Japan

[21] Appl. No.: 451,197

[22] Filed: Dec. 15, 1989

[30] Foreign Application Priority Data

Dec. 19, 1988 [JP] Japan .................. 63-318524

[51] Int. Cl.⁵ .............................................. G11B 7/00
[52] U.S. Cl. ................... 369/32; 369/44.29; 369/44.34
[58] Field of Search ............... 369/44.34, 44.35, 44.29, 369/32, 43, 124, 44.36, 109, 100, 44.26, 44.13, 44.28, 44.27; 360/78.05, 77.01–77.06; 250/201.5

[56] References Cited

U.S. PATENT DOCUMENTS

| | | | |
|---|---|---|---|
| 4,607,358 | 8/1986 | Maeda et al. | 369/44.29 |
| 4,718,051 | 1/1988 | Ohshima et al. | 369/44.29 |
| 4,726,004 | 2/1988 | Takasago et al. | 369/32 |
| 4,736,353 | 4/1988 | Kasai et al. | |
| 4,745,587 | 5/1988 | Maeda et al. | 369/32 |
| 4,751,695 | 6/1988 | Kaku et al. | 369/44.13 |
| 4,779,253 | 10/1988 | Getreuer et al. | 369/44.28 |
| 4,819,219 | 4/1989 | Nagano | 369/44.28 |
| 4,864,552 | 9/1989 | Getreuer et al. | 369/44.13 |
| 4,866,687 | 9/1989 | Kasai et al. | 369/32 |

FOREIGN PATENT DOCUMENTS

| | | |
|---|---|---|
| 0099576 | 2/1984 | European Pat. Off. . |
| 0215556 | 3/1987 | European Pat. Off. . |
| 0259913 | 3/1988 | European Pat. Off. . |
| 0272873 | 6/1988 | European Pat. Off. . |

Primary Examiner—Roy N. Envall, Jr.
Assistant Examiner—Thang V. Tran
Attorney, Agent, or Firm—Hill, Van Santen, Steadman & Simpson

[57] ABSTRACT

A recording and/or reproduction apparatus of an optical disc having recording tracks in which mirror areas are formed incorporates an optical head for recording or reproducing information signal onto or from the optical disc which has an optical detector for detecting a tracking error signal by a push-pull method; a fine actuator for precisely actuating the optical head finely; detecting means for detecting an output signal of the optical detector responding to reflected light from the mirror area; and driving means for driving the fine actuator in response to an output signal of the detecting means during the seeking operation.

3 Claims, 5 Drawing Sheets

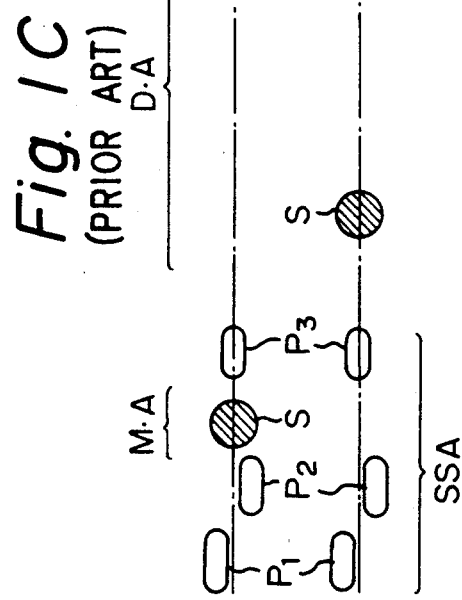
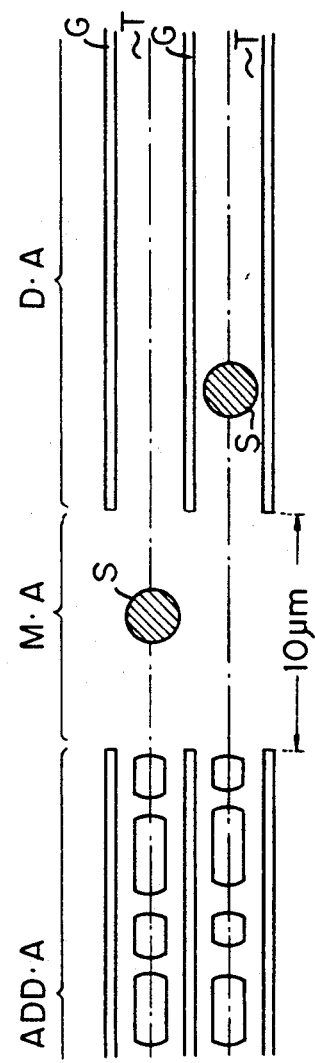
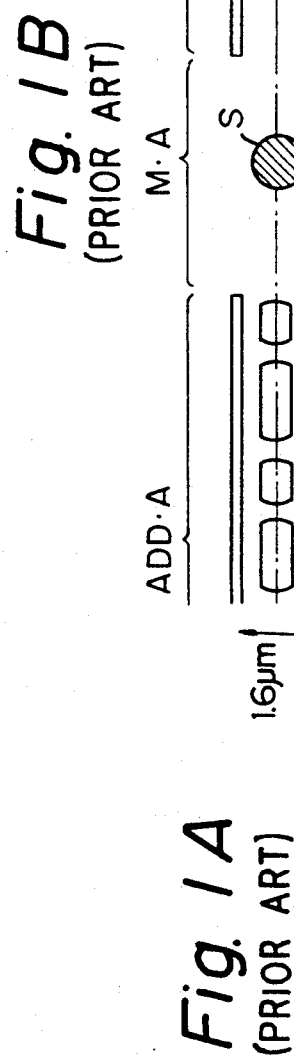

OPTICAL DISC RECORDING/REPRODUCTION APPARATUS WITH IMPROVED TRACK SEEKING

BACKGROUND OF THE INVENTION

1. Field of the Invention

The present invention relates to a recording and/or reproduction apparatus, and specifically to an optical disc on which recording tracks are continuously formatted by sample pits or pregrooves.

2. Description of the Prior Art

Among writable optical discs having a layer of a light sensitive medium, whose reflective index changes in response to the light, formed on the surface of the disc, there is a writable optical disc on which recording tracks are formed by sample pits or spiral pregrooves. FIGS. 1A, 1B and 1C show a plan view of such a writable optical disc and enlarged diagrams of recording tracks. In an optical disc, data areas D·A are formed by n sectors $H_1$ to $H_n$ as shown in FIG. 1A.

In the case of pregrooves, as shown in FIG. 1B, the tracks are separated by pregrooves G. The head portions of the tracks are used as an area ADD·A of address data (51 bytes) which was preformatted by, for instance, an emboss process or the like. A total reflective area in which nothing is recorded is formed after the address data area ADD·A. L After an area M·A of the total reflective area (hereinafter, referred to as a mirror area), a data area D·A into/from which data can be actually written or read out is positioned.

In the case of an optical disc such that preformatted areas are formed by sample pits, as shown in FIG. 1C, two wobbling pits $P_1$, and $P_2$ and clock pits $P_3$ are prerecorded. The mirror area M·A is formed between the wobbling pits $P_2$ and the clock pits $P_3$. The recording and/or reproduction apparatus of an optical disc is controlled so as to be always set into the reading mode in an area SSA or in the address data area ADD·A. In the data area D·A, a laser beam is controlled so as to write data in the recording mode and to read out the data in the reading mode.

A laser spot S irradiated from the optical head is subjected to position control via the tracking servo by the latter detecting the reflected light from the wobbling pits $P_1$, and $P_2$ or the pregroove G. In the ordinary recording or reproducing mode, the laser spot S is controlled so as to always pass down the center of the track. The mirror area (M·A) is provided to detect the power of the laser spot and the focusing state. By detecting the reflected light of the laser beam irradiating the mirror area, the optimum focusing servo can be applied and, in the reading, writing, or erasing mode, the intensity of the laser power can be controlled.

An optical head for a laser beam of such an optical disc is generally constructed by a biaxial actuator (fine actuator) to apply the focusing servo control and tracking servo control and a linear motor (coarse actuator) to move the fine actuator in the radial direction of the disc. To detect the reflected light from the disc surface, a two-part detector having two divided photo sensitive surfaces is used. By detecting a field image from the optical disc surface which is formed on the two-divided detector, using a push-pull method a tracking error signal can be detected.

When a target track on the optical disc is sought by the optical head as mentioned above, in general, a jump signal is supplied to the coarse actuator. The optical head is moved at a high speed to seek in the direction toward the inner track or toward the outer track on the optical disc, a laser beam is irradiated onto a target track, and data is read out or written at that point.

FIG. 2 shows an outline of a conventional driving circuit to execute such a seeking operation. Reference numeral 1 denotes a drive amplifier for a fine actuator 2, and 3 indicates a drive amplifier for a coarse actuator 4. In the ordinary recording or reproducing mode, a tracking error signal TE is supplied from a terminal a of a switch $S_1$, through the drive amplifier 1 to a tracking coil of the fine actuator 2. The integrated voltage of the tracking error signal TE is also supplied to the coarse actuator 4 through a terminal a of the switch $S_2$.

In the seeking operation to move the optical head to a target track, the switch $S_2$ is switched and a seeking voltage $S_v$ is supplied from a terminal b of the switch $S_2$ to move the coarse actuator 4 to the target track at a high speed.

The seeking voltage $S_v$, comprises an accelerating voltage and a decelerating voltage in order to make the seeking speed high and has a drive waveform such that the optical head stops over the target track. However, generally, since an objective lens of the fine actuator 2 is supported so that it can oscillate, if the coarse actuator 4 is moved at a high speed, the objective lens oscillates extremely at the resonance frequency of the fine actuator 2. As a result, it is difficult to immediately start the tracking servo over the target track or at a position near it.

Therefore, for instance, as shown in FIGS. 2 and 3, there is proposed a method using a position sensor 5 (FIG. 2). The position sensor 5 detects the position in the radial direction of an objective lens L by irradiating a light $P_1$, from the light source LS to an actuator A to drive the objective lens L and detecting the reflected lights $P_2$ and $P_3$ by detectors $D_1$, and $D_2$. During the seeking operation, while the switch $S_1$, is switched, a position signal of the objective lens L is fed back from the terminal b through a coefficient circuit 6, and the vibration of the objective lens L is suppressed.

However, in such an apparatus, it is fairly difficult to provide the position sensor 5 for the small fine actuator. In addition, there is a problem such that by providing the position sensor 5, the optical head becomes expensive and the response characteristic of the fine actuator is deteriorated.

OBJECTS AND SUMMARY OF THE INVENTION

It is, therefore, an object of the present invention to provide a recording and/or reproduction apparatus of an optical disc which can suppress the vibration of the objective lens.

According to an aspect of the present invention, there is provided a recording and/or reproduction apparatus of an optical disc having recording tracks in which mirror areas are formed respectively, comprising: an optical head for recording or reproducing information signals onto or from the optical disc which has an optical detector for detecting a tracking error signal by a push-pull method; a fine actuator for actuating the optical head with precision; detecting means for detecting an output signal of the optical detector responding to reflected light from the mirror area; and driving means for driving the fine actuator in response to an output signal of the detecting means during the seeking operation.

The above, and other, objects, features and advantages of the present invention will become readily apparent from the following detailed description thereof which is to be read in connection with the accompanying drawings.

BRIEF DESCRIPTION OF THE DRAWINGS

FIG. 1A is a plan view of an optical disc;

FIG. 1B is an enlarged diagram of tracks on the optical disc on which pregrooves are formed;

FIG. 1C is an enlarged diagram of tracks in the case where sample pits are formed in a servo area;

DETAILED DESCRIPTION OF THE PREFERRED EMBODIMENTS

Figure 2:
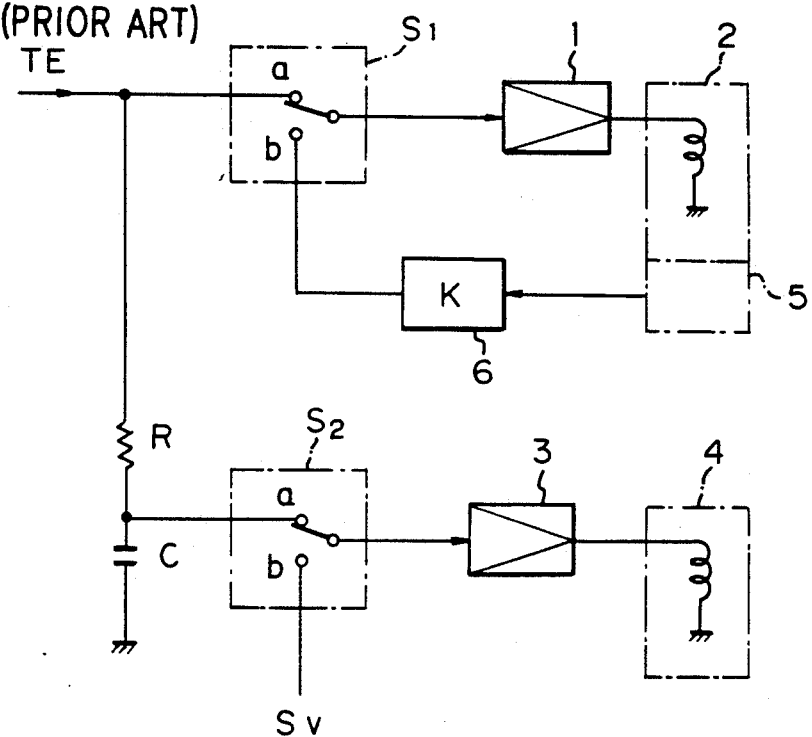
FIG. 2 is an explanatory diagram of an apparatus for seeking and tracking.
Figure 3:
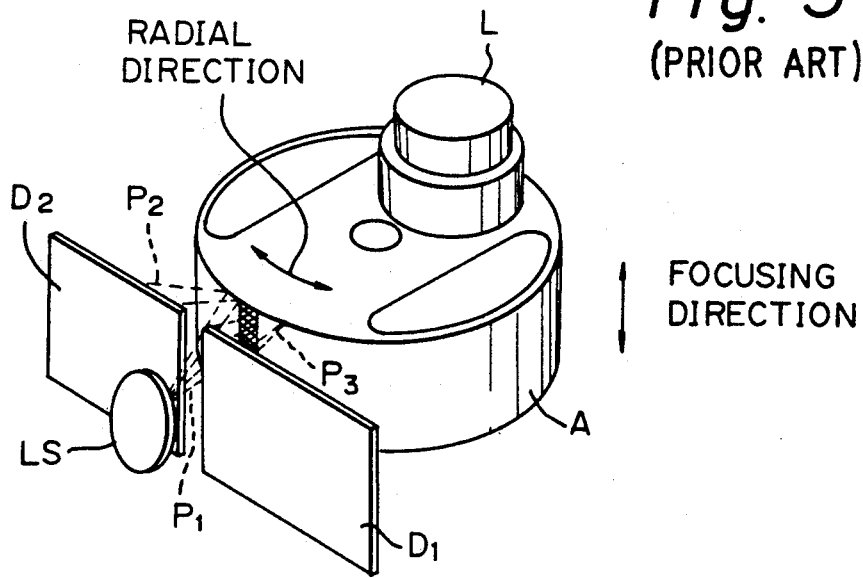
FIG. 3 is a schematic diagram of a position sensor to detect a position of an objective lens.
Figure 4:
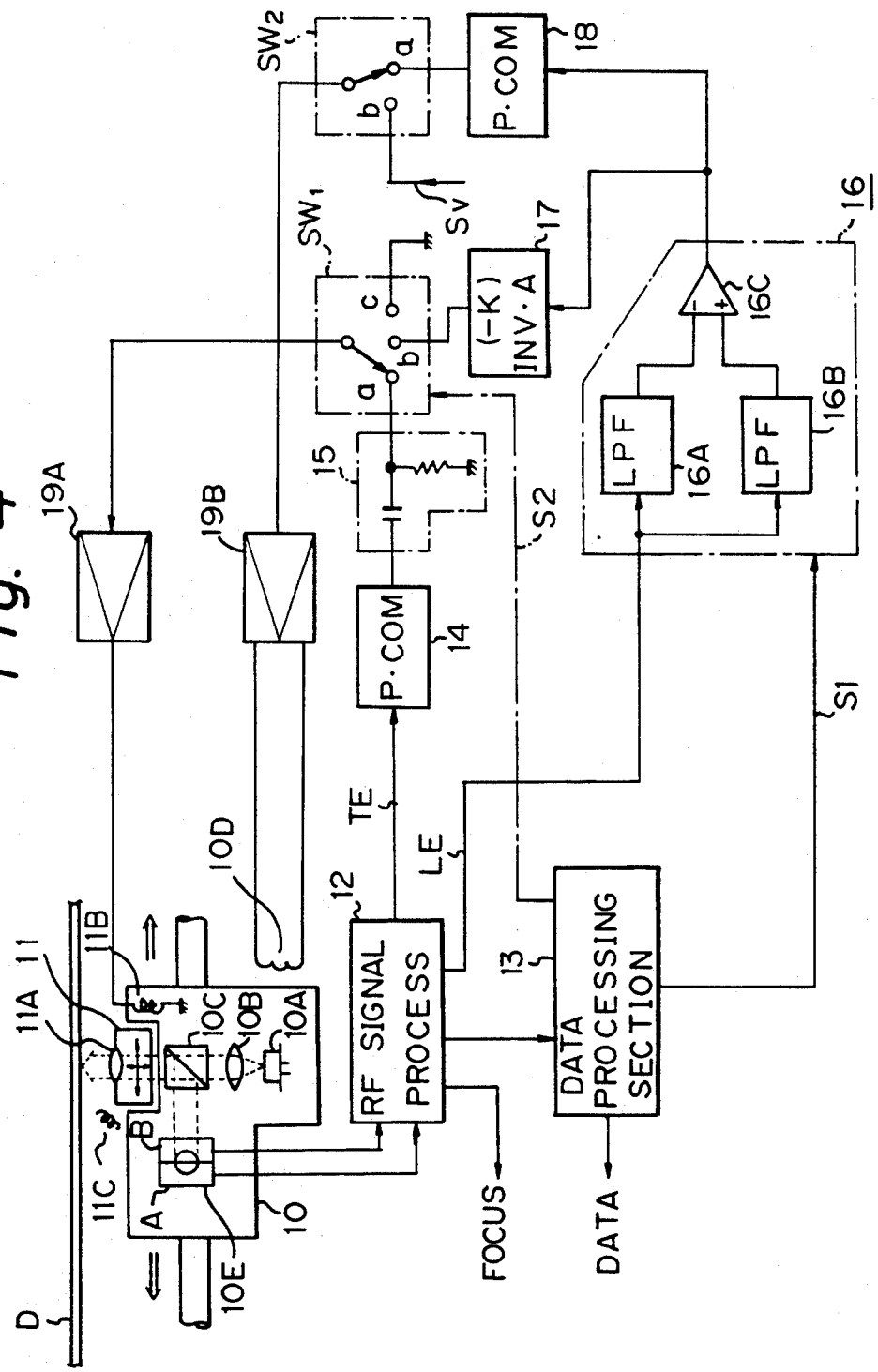
FIG. 4 is a block diagram showing an embodiment of the present invention.

FIG. 4 shows a block diagram of an embodiment of the present invention. In FIG. 4, reference numeral 10 denotes a coarse actuator constructing an optical head and 11 indicates a fine actuator mounted on the coarse actuator 10. The coarse actuator 10 includes a laser emitting source 10A, a lens 10B, a beam splitter 10C, and a drive coil 10D of a linear motor. Further, a two-divided detector 10E to detect the reflected light is provided. On the other hand, the fine actuator 11 has an objective lens 11A. The objective lens 11A is moved in the vertical and horizontal directions by a tracking coil 11B and a focusing coil 11C.

Outputs of the two-divided detector 11E having two photo sensitive surfaces A and B are supplied to an RF signal processing block 12. Data on the optical disc D is read out by the RF signal processing block 12 and a focusing error signal and a tracking error signal are detected. The tracking error signal can be obtained by subtracting a reproduced signal of a photo sensitive surface B from a reproduced signal of a photo sensitive surface A. In the case of an optical disc on which sample pits are formed, the tracking error signal can be derived by sampling the reproduced signals corresponding to the wobbling pits $P_1$ and $P_2$ respectively and subtracting their sampled values.

Reference numeral 13 denotes a data processing block. Address data of the optical disc D is detected and the data is read out. The position of the track which the optical head faces at present is detected by the address data. The tracking error signal TE is supplied to a tracking drive amplifier 19A through a phase compensating circuit 14, a differentiating circuit 15 and a terminal a of the switch $SW_1$, thereby applying the tracking servo.

Figure 5:
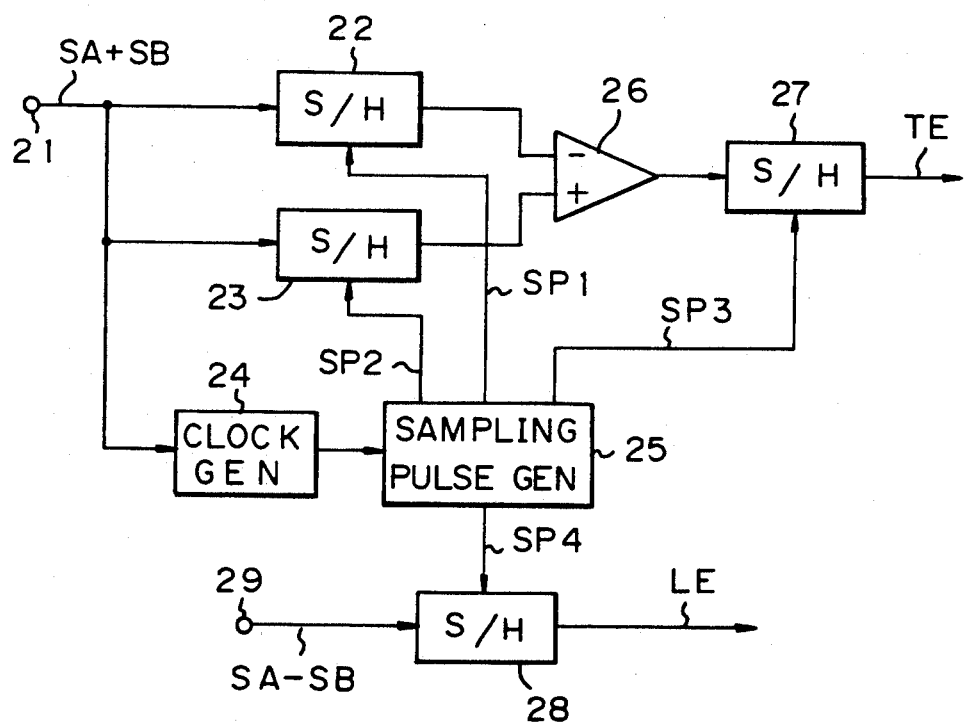
FIG. 5 is a block diagram showing an example of an RF signal processing circuit.

An example of the RF signal processing circuit 12 is shown in FIG. 5. One detecting signal SA and another detecting signal SB from the two-divided detector 10E are added together. The signal (SA+SB) is supplied to sampling circuits 22 and 23, and a clock generator 24 respectively. The clock generator 24 generates a clock signal synchronized with a reproduced signal. The clock signal is supplied to a sampling pulse generator 25. The sampling pulse generator 25 generates sampling pulses SP1, SP2, SP3, and SP4.

The sampling pulse SP1 is supplied to the sampling circuit 22 and the sampling pulse SP2 is supplied to the sampling circuit 23. The timing of the sampling pulses SP1 and SP2 are in synchronism with that of the wobbling pits $P_1$ and $P_2$. An output signal of the sampling circuit 22 is subtracted from an output signal of the sampling circuit 23 by a subtracting circuit 26. An output signal from the subtracting circuit 26 is supplied to a sampling circuit 27. The sampling pulse SP3 for the sampling circuit 27 has a slight delay amount to the sampling pulse SP2. The tracking error signal TE is obtained from the sampling circuit 27.

A differential signal (SA−SB) which is derived from subtracting two signals of the two divided detector 10E is supplied to a sampling circuit 28 from an input terminal 29. The sampling pulse SP4 for the sampling circuit 28 is generated when the laser beam is scanning the mirror area M·A. A push-pull or error signal LE is obtained from the sampling circuit 28. The push-pull signal LE is supplied to a spot position detecting section 16 as shown in FIG. 4.

The spot position detecting section 16 comprises first and second low-pass filters 16A and 16B and a subtracting circuit 16C. An output of the spot position detecting section 16 is supplied to the terminal b of the switch $SW_2$ through an inversional coefficient circuit 17 and is also supplied to the terminal a of the switch $SW_2$ through a phase compensator 18. An output of the switch $SW_2$ is supplied to the drive coil 10D of the linear motor via a drive amplifier 19B of the coarse actuator 10. In the ordinary recording or reproducing mode, the tracking control of the fine actuator 11 is executed by the tracking error signal TE which is supplied from the terminal a of the switch $SW_1$.

In this embodiment, the level of the push-pull or error signal LE indicates the deviation of the objective lens 11A, that is, the deviation of the fine actuator 11. The detection information from the spot position detecting section 16 is supplied from the terminal a of the switch $SW_2$ to the drive coil 10D of the linear motor to drive the coarse actuator 10.

Figure 6A:
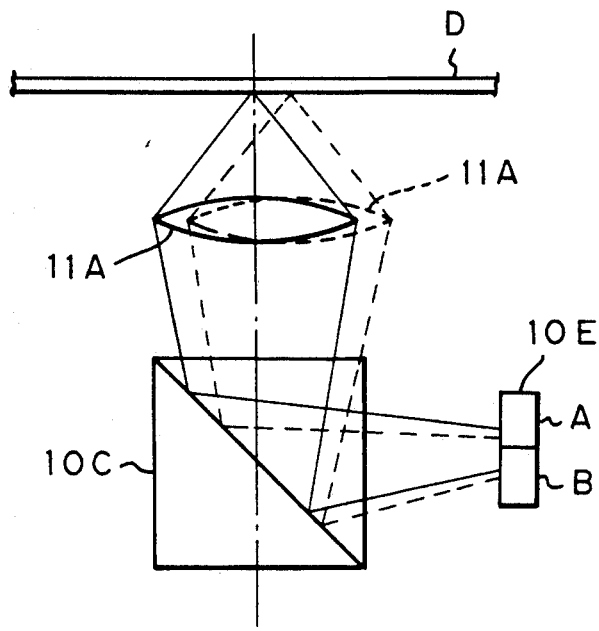
FIGS. 6A, 6B and 6C are schematic diagrams for explaining a detecting operation.
Figure 6B:
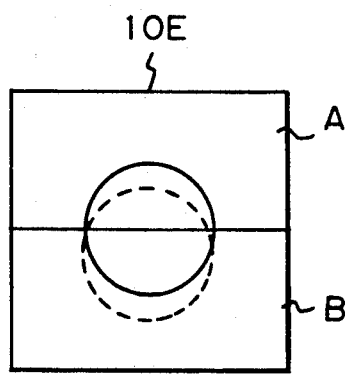
Figure 6C:
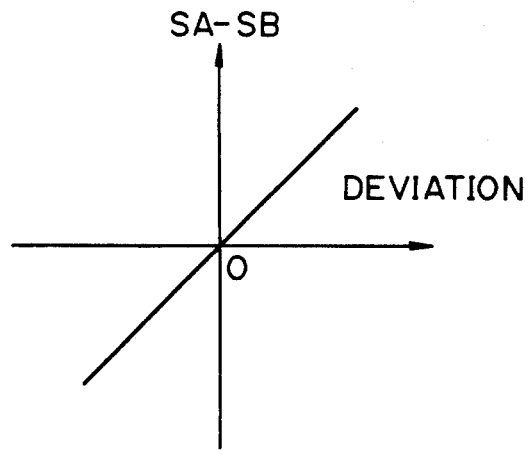

When the tracking servo is being applied or in the seeking operation, if the positions of the fine actuator 11 and coarse actuator 10 are relatively deviated, a deviation occurs between the optical axis of the laser emitting source and the optical axis of the objective lens 11A as shown in FIG. 6A. The right and left images formed on the two-divided detector 10E become unbalanced due to such a deviation as shown in FIG. 6B. FIG. 6C shows a relation between the deviation and the push-pull signal LE (SASB).

In the ordinary recording or reproducing mode, the reflected light is detected by the two-divided detector 10E at the time when the laser beam irradiates the mirror area. The deviation of the objective lens relative to the coarse actuator 10 can be detected from the push-pull signal LE. Accordingly, by feeding back the deviation amount to the drive coil 10D of the coarse actuator 10, the tracking control of the coarse actuator 10 can be also executed.

In this spot position detecting section 16, a skew component of the optical disc is detected from the first low-pass filter 16A having a time constant longer than the rotational period of the optical disc and the deviation of the objective lens 11A is detected by the second low-pass filter 16B having a relatively short time constant. Therefore, the tracking signal of the coarse actuator 10, from which any influence by the skew is eliminated, is obtained from the subtracting circuit 16C.

The operation when the optical head seeks a target track will now be described.

The switch SW₂ is switched to the terminal b, and the seeking voltage S, is supplied to the drive amplifier 19B through the switch SW₂. As a result, the linear motor is accelerated and is moved to a target track at a high speed. In this case, the coarse actuator 10 is controlled in a manner such that a velocity of the actuator increases simultaneously with the start of the seeking operation, the velocity is decelerated from the middle point, and the velocity is set to almost zero at a position over the target track.

Since the address data or sample pits are radially formed in the radial direction of the optical disc, when the moving velocity of the optical head is not so fast, an address area or a servo area can be detected. When the address area or servo area can be read during the seeking operation, a control signal $S_2$ is supplied to the switch SW1 from the data processing block 13 and then the terminal b of the switch $SW_1$ is selected. On the other hand, in the spot position detecting section 16, for instance, the vibration component of the objective lens 11A due to the movement is detected by the low-pass filter 16B having a relatively short time constant i. The skew component of the disc is detected by the low-pass filter 16A having a relatively long time constant $\tau_2$.

During the seeking operation, the skew component is held by a signal $S_1$. The signal of the vibration component which is output from the subtracting circuit 16C is supplied to the tracking coil 11B of the fine actuator 11 through the inversional coefficient circuit 17. Therefore, even when the objective lens 11A oscillates wildly when the optical head is moved at a high speed, at positions near the time points corresponding to the start and the finish the seeking operation, the vibration signal component is fed back to the tracking coil 11B of the fine actuator 11 and the vibration of the objective lens 11A can be suppressed. When the movement velocity of the optical head is fast, the address area or servo area cannot be accurately detected and the mirror area cannot be detected. In this case, the terminal c of the switch $SW_1$ is selected by a control signal $S_2$ which is output from the data processing block 13 and the drive signal of the objective lens 11A supplied to the drive amplifier 19A is set to zero.

As described above, according to the recording and/or reproduction apparatus of an optical disc of the present invention, when address data can be read, the push-pull signal is always obtained by the two-divided detector, and the deviation information of the objective lens is detected. Therefore, the present invention achieves the advantage that even during the seeking operation, near the time point when the moving velocity decreases at a position near the target track, the vibration of the objective lens can be suppressed. As a result, the tracking servo can be soon applied after completion of the seeking operation.

On the other hand, in the ordinary recording or reproducing mode, since the deviation information of the fine actuator is detected from the reflected lights of the mirror area, there is an advantage such that the tracking servo of the coarse actuator can be easily executed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A recording and/or reproduction apparatus of an optical disc having recording tracks in which mirror areas are formed respectively, comprising:

an optical head for recording or reproducing an information signal onto or from the optical disc, said head having an optical detector for detecting a tracking error signal by a push-pull method;

control means for controlling the position of said head relative to a predetermined one of said tracks during a recording operation or a reproducing operation and for moving said head to said predetermined track during a seeking operation, said control means comprising:

a fine actuator for precisely actuating said optical head finely;

detecting means for detecting an output signal of said optical detector responding to reflected light from said mirror area; and driving means for driving said fine actuator in response to an output signal of said detecting means only during said seeking operation.

2. A recording and/or reproduction apparatus of an optical disc according to claim 1, including a coarse actuator for actuating said optical head coarsely; and driving means for driving said coarse actuator in response to an output signal of said detecting means during said recording or reproducing operation of said optical disc.

3. A recording and/or reproduction apparatus of an optical disc having recording tracks in which mirror areas are formed respectively, comprising:

an optical head for recording or reproducing information signals onto or from the optical disc, said head having an optical detector for detecting a tracking error signal by a push-pull method;

a fine actuator for precisely actuating said optical head finely;

detecting means for detecting an output signal of said optical detector responding to reflected light from said mirror area;

driving means for driving said fine actuator in response to an output signal of said detecting means during the seeking operation;

said detecting means comprising a sampling circuit coupled with said optical detector;

a first low pass filter having a first time constant coupled with an output side of said sampling circuit; and a second low-pass filter having a second time constant, longer than said first time constant, coupled with an output side of said sampling circuit; and a subtracting circuit coupled with said first low-pass filter and said second low-pass filter.

* * * * *